(12) United States Patent
Pirog et al.

(10) Patent No.: US 11,020,889 B2
(45) Date of Patent: Jun. 1, 2021

(54) METHOD AND SYSTEM FOR GENERATING, PROCESSING AND DISPLAYING AN INDICATOR OF PERFORMANCE OF AN INJECTION MOLDING MACHINE

(71) Applicant: Husky Injection Molding Systems Ltd., Bolton (CA)

(72) Inventors: Roman Robert Pirog, Caledon East (CA); Raphaël Juvan, Coin sur Seilli (FR)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 14/914,435

(22) PCT Filed: Aug. 19, 2014

(86) PCT No.: PCT/CA2014/050792
§ 371 (c)(1),
(2) Date: Feb. 25, 2016

(87) PCT Pub. No.: WO2015/031989
PCT Pub. Date: Mar. 12, 2015

(65) Prior Publication Data
US 2016/0214301 A1    Jul. 28, 2016

Related U.S. Application Data

(60) Provisional application No. 61/873,980, filed on Sep. 5, 2013.

(51) Int. Cl.
*B29C 45/76*    (2006.01)
*G05B 23/02*    (2006.01)
(Continued)

(52) U.S. Cl.
CPC .......... *B29C 45/7666* (2013.01); *B29C 45/76* (2013.01); *G05B 15/02* (2013.01);
(Continued)

(58) Field of Classification Search
CPC ................ B29C 45/7666; B29C 45/76; B29C 2945/76518; B29C 2945/76026;
(Continued)

(56) References Cited

U.S. PATENT DOCUMENTS 3,920,367 A    11/1975  Ma et al.
5,309,369 A *  5/1994   Kamiguchi ............. B29C 45/76
                                                         264/40.7
(Continued)

FOREIGN PATENT DOCUMENTS

DE    102007013044 A1    10/2007
DE    10222662 B4         7/2008
(Continued)

OTHER PUBLICATIONS

Michael Philips, "Impact of Hot Runners on Life Cycle Molding Costs", MoldMaking Technology (Year: 2010).*
(Continued)

*Primary Examiner* — Bitew A Dinke

(57) ABSTRACT

There is disclosed a method (400) of operating a molding system (100), the method (400) executable by a controller (140) of the molding system (100). The method comprises appreciating (402) a plurality of operational parameters associated with the molding system (100); based on at least a sub-set of the plurality of operational parameters, generating (404) a machine performance index, the machine performance index being a single value representative of the at least a sub-set of the plurality of operational parameters and being instrumental in enabling an operator of the molding system (100) to appreciate an economic productiv-
(Continued)

ity factor associated therewith; causing (406) the machine performance index to be displayed on an interface of the controller (140).

10 Claims, 4 Drawing Sheets

(51) Int. Cl.
  *G05B 15/02* (2006.01)
  *G05B 19/406* (2006.01)
  *B29K 105/00* (2006.01)
(52) U.S. Cl.
  CPC ....... *G05B 19/406* (2013.01); *G05B 23/0216* (2013.01); *B29C 2045/7606* (2013.01); *B29C 2945/761* (2013.01); *B29C 2945/7613* (2013.01); *B29C 2945/76026* (2013.01); *B29C 2945/76076* (2013.01); *B29C 2945/76518* (2013.01); *B29K 2105/258* (2013.01); *G05B 2219/45244* (2013.01)
(58) Field of Classification Search
  CPC .... B29C 2945/7613; B29C 2045/7606; B29C 2945/761; B29C 2945/76076; G05B 19/406; G05B 15/02; G05B 23/0216; G05B 2219/45244; B29K 2105/258
  See application file for complete search history.

(56) References Cited

U.S. PATENT DOCUMENTS

| | | | |
|---|---|---|---|
| 5,772,951 A * | 6/1998 | Coxhead | B29C 31/00 264/532 |
| 5,900,259 A | 5/1999 | Miyoshi et al. | |
| 5,914,884 A | 6/1999 | Gur Ali et al. | |
| 6,073,059 A | 6/2000 | Hayashi et al. | |
| 6,144,182 A * | 11/2000 | Totani | B29C 45/7666 264/40.3 |
| 6,258,303 B1 * | 7/2001 | Hibi | B29C 45/76 264/40.5 |
| 6,275,741 B1 * | 8/2001 | Choi | B29C 45/76 700/10 |
| 6,308,141 B1 * | 10/2001 | Saito | B29C 45/76 425/542 |
| 6,311,101 B1 | 10/2001 | Kastner | |
| 6,684,264 B1 | 1/2004 | Choi | |
| 6,980,882 B2 | 12/2005 | Yamazaki et al. | |
| 7,031,800 B2 | 4/2006 | Bulgrin | |
| 7,117,050 B2 | 10/2006 | Sasaki et al. | |
| 7,261,009 B2 | 8/2007 | Saito et al. | |
| 7,346,425 B2 | 3/2008 | Nishizawa et al. | |
| 7,349,747 B2 | 3/2008 | Saito et al. | |
| 7,465,417 B2 | 12/2008 | Hutson et al. | |
| 7,496,427 B2 | 2/2009 | Konishi | |
| 7,517,206 B2 | 4/2009 | Nishizawa | |
| 7,725,211 B2 | 5/2010 | Ludwig | |
| 7,840,297 B1 | 11/2010 | Tuszynski | |
| 7,937,166 B2 | 5/2011 | Laatsch | |
| 8,280,544 B2 | 10/2012 | Catoen et al. | |
| 8,425,216 B2 | 4/2013 | Catoen | |
| 8,457,775 B2 | 6/2013 | Chen et al. | |
| 8,463,422 B2 | 6/2013 | Betsche et al. | |
| 2001/0051858 A1 | 12/2001 | Liang et al. | |
| 2003/0065420 A1 * | 4/2003 | Kachnic | B29C 45/76 700/204 |
| 2003/0080452 A1 * | 5/2003 | Bulgrin | B29C 45/76 264/40.1 |
| 2003/0211188 A1 * | 11/2003 | Kachnic | B29C 45/76 425/137 |
| 2004/0059452 A1 * | 3/2004 | Kachnic | B29C 45/76 700/108 |
| 2004/0128020 A1 | 7/2004 | Fischbach | |
| 2004/0148136 A1 * | 7/2004 | Sasaki | G05B 19/4065 702/188 |
| 2004/0185136 A1 * | 9/2004 | Domodossola | B29C 45/42 425/547 |
| 2004/0262799 A1 | 12/2004 | Wang | |
| 2005/0127571 A1 * | 6/2005 | Weinmann | B29C 45/7626 264/408 |
| 2005/0142244 A1 * | 6/2005 | Unterlander | B29C 45/045 425/547 |
| 2006/0006565 A1 * | 1/2006 | Yamaura | B29C 45/7666 264/40.1 |
| 2006/0009874 A1 * | 1/2006 | Saito | B29C 45/76 700/204 |
| 2006/0138696 A1 * | 6/2006 | Weinmann | B29C 45/7207 264/237 |
| 2006/0159793 A1 * | 7/2006 | Hahn | B29C 45/16 425/145 |
| 2006/0224540 A1 * | 10/2006 | Shioiri | G05B 19/41875 706/23 |
| 2006/0235568 A1 * | 10/2006 | Araki | B29C 45/76 700/200 |
| 2007/0106943 A1 | 5/2007 | Fischer | |
| 2008/0099943 A1 * | 5/2008 | Yamagiwa | B29B 17/00 264/40.5 |
| 2008/0150181 A1 * | 6/2008 | Maruyama | B29C 45/766 264/40.7 |
| 2008/0184114 A1 * | 7/2008 | Hano | B29C 45/76 715/700 |
| 2008/0286396 A1 * | 11/2008 | Hein | B29C 45/4225 425/139 |
| 2008/0305202 A1 * | 12/2008 | Oomori | B29C 45/76 425/171 |
| 2009/0026646 A1 * | 1/2009 | Maruyama | B29C 45/52 264/40.5 |
| 2009/0045538 A1 * | 2/2009 | Craig | B29C 45/54 264/40.4 |
| 2009/0287342 A1 | 11/2009 | Hano | |
| 2010/0065979 A1 * | 3/2010 | Betsche | B29C 45/76 264/40.6 |
| 2010/0295199 A1 * | 11/2010 | Zhang | B29C 45/7646 264/40.6 |
| 2011/0106284 A1 | 5/2011 | Catoen | |
| 2011/0106285 A1 * | 5/2011 | Catoen | B29C 45/76 700/99 |
| 2011/0230995 A1 * | 9/2011 | Irwin | B29C 45/76 700/99 |
| 2011/0316196 A1 * | 12/2011 | Altonen | B29C 45/045 264/328.7 |
| 2012/0119413 A1 * | 5/2012 | Niewels | B29C 35/16 264/237 |
| 2012/0123583 A1 * | 5/2012 | Hazen | G05B 15/02 700/110 |
| 2013/0022698 A1 * | 1/2013 | Kasuga | B29C 45/766 425/149 |
| 2013/0061557 A1 * | 3/2013 | Kitano | B67C 7/0073 53/167 |
| 2013/0069280 A1 * | 3/2013 | Altonen | B29C 45/77 264/328.1 |
| 2013/0123967 A1 * | 5/2013 | Gruber | G05B 23/0216 700/117 |
| 2013/0156875 A1 * | 6/2013 | Maruyama | B29C 45/84 425/150 |
| 2013/0245807 A1 * | 9/2013 | Herbst | G05B 13/024 700/117 |
| 2013/0345855 A1 * | 12/2013 | Tsai | B29C 45/7666 700/200 |
| 2014/0046465 A1 * | 2/2014 | de Oliveira Antunes | B29C 45/76 700/97 |
| 2015/0115491 A1 * | 4/2015 | Altonen | B29C 45/7646 264/40.7 |

FOREIGN PATENT DOCUMENTS

| | | |
|---|---|---|
| DE | 102011018156 A1 | 12/2011 |
| DE | 102011112736 A1 | 4/2012 |

(56) References Cited

FOREIGN PATENT DOCUMENTS

| | | |
|---|---|---|
| DE | 102011102776 A1 | 11/2012 |
| EP | 1020279 A1 | 7/2000 |
| EP | 0744267 B1 | 7/2001 |
| EP | 1297941 A2 | 4/2003 |
| EP | 1708060 A2 * | 10/2006 ........... G05B 19/404 |
| EP | 1724093 A1 | 11/2006 |
| EP | 1614522 B1 | 10/2007 |
| EP | 1656245 B1 | 12/2007 |
| EP | 1306188 B1 | 4/2011 |
| EP | 1346812 B1 | 8/2011 |
| JP | 3221878 B2 | 10/2001 |
| JP | 2004155105 A | 6/2004 |
| JP | 2004155118 A | 6/2004 |
| JP | 2005297571 A | 10/2005 |
| JP | 2006021470 A | 1/2006 |
| JP | 2006056261 A | 3/2006 |
| JP | 2007216449 A | 8/2007 |
| WO | 2002036326 A1 | 5/2002 |
| WO | 2004037513 A1 | 5/2004 |
| WO | 2007045073 A1 | 4/2007 |
| WO | 2012002374 A1 | 1/2012 |
| WO | 2012115105 A1 | 8/2012 |
| WO | 2013182190 A1 | 12/2013 |

OTHER PUBLICATIONS

European Search Report, Horubala Tomasz, dated Apr. 7, 2017, 7 pages.
PCT International Search Report, Pierre Cuerrier, 3 pages, dated Oct. 29, 2014.

* cited by examiner

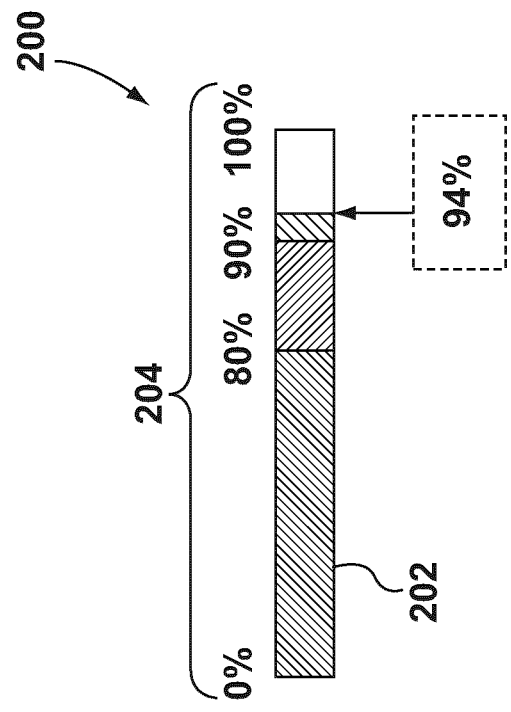
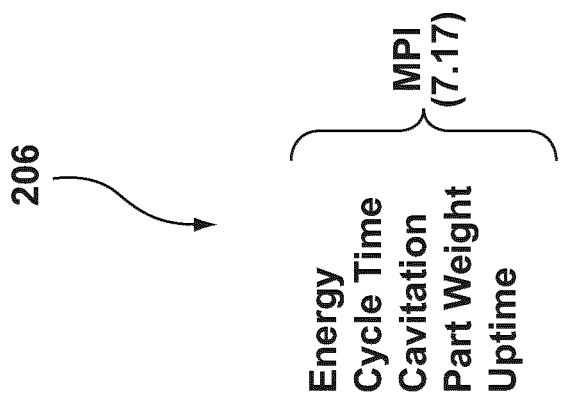
FIG. 2

METHOD AND SYSTEM FOR GENERATING, PROCESSING AND DISPLAYING AN INDICATOR OF PERFORMANCE OF AN INJECTION MOLDING MACHINE

FIELD

The present technology generally relates to, but is not limited to, molding systems, and more specifically the present technology relates to, but is not limited to, a method and system for generating, processing and displaying an indicator of performance of an injection molding machine.

BACKGROUND

Molding is a process by virtue of which a molded article can be formed from molding material by using a molding system. Various molded articles can be formed by using the molding process, such as an injection molding process. One example of a molded article that can be formed, for example, from Polyethylene Terephthalate (PET) material is a preform that is capable of being subsequently blown into a beverage container, such as, a bottle and the like.

As an illustration, injection molding of PET material involves heating the molding material (e.g. PET pellets, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by a clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be de-molded, i.e. ejected off of the core piece. Ejection structures are known to assist in removing the molded articles from the core halves. Examples of the ejection structures include stripper plates, ejector pins, etc.

A typical injection molding machine has a multitude of operational parameters that may affect the quality of the ultimate molded article that is produced. Depending on the sophistication of the given injection molding machines, some or all of these operational parameters may need to be monitored and adjusted by the operator. Each operational parameter has its own optimal (target) setting.

Within prior art systems, it is up to the operator to monitor each of these settings and understand how the underlying control parameters may be adjusted to optimize performance of the injection molding machine. Productivity of the injection molding machine is therefore dependent on the operator's attentiveness to and skill in tuning the machine. If the operator does not check the performance and adjust the settings of the injection molding machine on a sufficiently regular basis, the injection molding machines are likely to run at less than optimal productivity, which, in turn, results in higher operational costs.

SUMMARY

According to a first broad aspect of the present technology, there is provided a method of operating a molding system. The method can be executable by a controller of the molding system. The method comprises appreciating a plurality of operational parameters associated with the molding system; based on at least a sub-set of the plurality of operational parameters, generating a machine performance index, the machine performance index being a single value representative of the at least the sub-set of the plurality of operational parameters and being instrumental in enabling an operator of the molding system to appreciate an economic productivity factor associated therewith; causing the machine performance index to be displayed on an interface of the controller.

According to another broad aspect of the present technology, there is provided a method of operating a first molding system and a second molding system. The method can be executable at a supervisory entity associated with and in communication with the first molding system and the second molding system. The method comprises (i) receiving an indication of a first machine performance index being indicative of an economic productivity factor associated with the first molding system; (ii) receiving an indication of a second machine performance index being indicative of an economic productivity factor associated with the second molding system; and (iii) displaying both the first machine performance index and the second machine performance index to the operator of the supervisory entity, each of the first machine performance index and the second machine performance index being a respective single value based on a respective plurality of operational parameters of the respective first and second molding systems.

According to yet another broad aspect of the present technology, there is provided a controller of a molding system, the controller having a user interface. The controller is configured to: appreciate a plurality of operational parameters associated with the molding system; based on at least a sub-set of the plurality of operational parameters, generate a machine performance index, the machine performance index being a single value representative of the at least a sub-set of the plurality of operational parameters and being instrumental in enabling an operator of the molding system to appreciate an economic productivity factor associated therewith; cause the machine performance index to be displayed on the user interface.

According to yet another broad aspect of the present technology, there is provided a controller of a molding system, the controller having a user interface. The controller comprises: means for appreciating a plurality of operational parameters associated with the molding system; means for generating, based on at least a sub-set of the plurality of operational parameters, a machine performance index, the machine performance index being a single value representative of the at least a sub-set of the plurality of operational parameters and being instrumental in enabling an operator of the molding system to appreciate an economic productivity factor associated therewith; means for causing the machine performance index to be displayed on an interface of the controller.

According to yet another broad aspect of the present technology, there is provided a method of operating a molding system, the method executable by a controller of the molding system. The method comprises: appreciating a plurality of operational parameters associated with the molding system; based on at least a sub-set of the plurality of operational parameters, generating a machine performance index, the machine performance index being a single value representative of the at least a sub-set of the plurality of operational parameters and being instrumental in enabling an operator of the molding system to appreciate an economic productivity factor associated therewith; causing the machine performance index to be made available to an operator of the molding system.

These and other aspects and features of non-limiting embodiments of the present technology will now become apparent to those skilled in the art upon review of the following description of specific non-limiting embodiments of the technology in conjunction with the accompanying drawings.

DESCRIPTION OF THE DRAWINGS

A better understanding of the embodiments of the present technology (including alternatives and/or variations thereof) may be obtained with reference to the detailed description of the non-limiting embodiments along with the following drawings, in which:

FIG. 2 is a schematic diagram of a normalized machine performance index indicator 200, the normalized machine performance index indicator 200 displayable on an HMI of a controller 140 of the molding system 100 of FIG. 1, the normalized machine performance index indicator 200 being implemented in accordance with non-limiting embodiments of the present technology;

The drawings are not necessarily to scale and are may be illustrated by phantom lines, diagrammatic representations and fragmentary views. In certain instances, details that are not necessary for an understanding of the non-limiting embodiments or that render other details difficult to perceive may have been omitted.

DETAILED DESCRIPTION OF EMBODIMENTS

Figure 1:
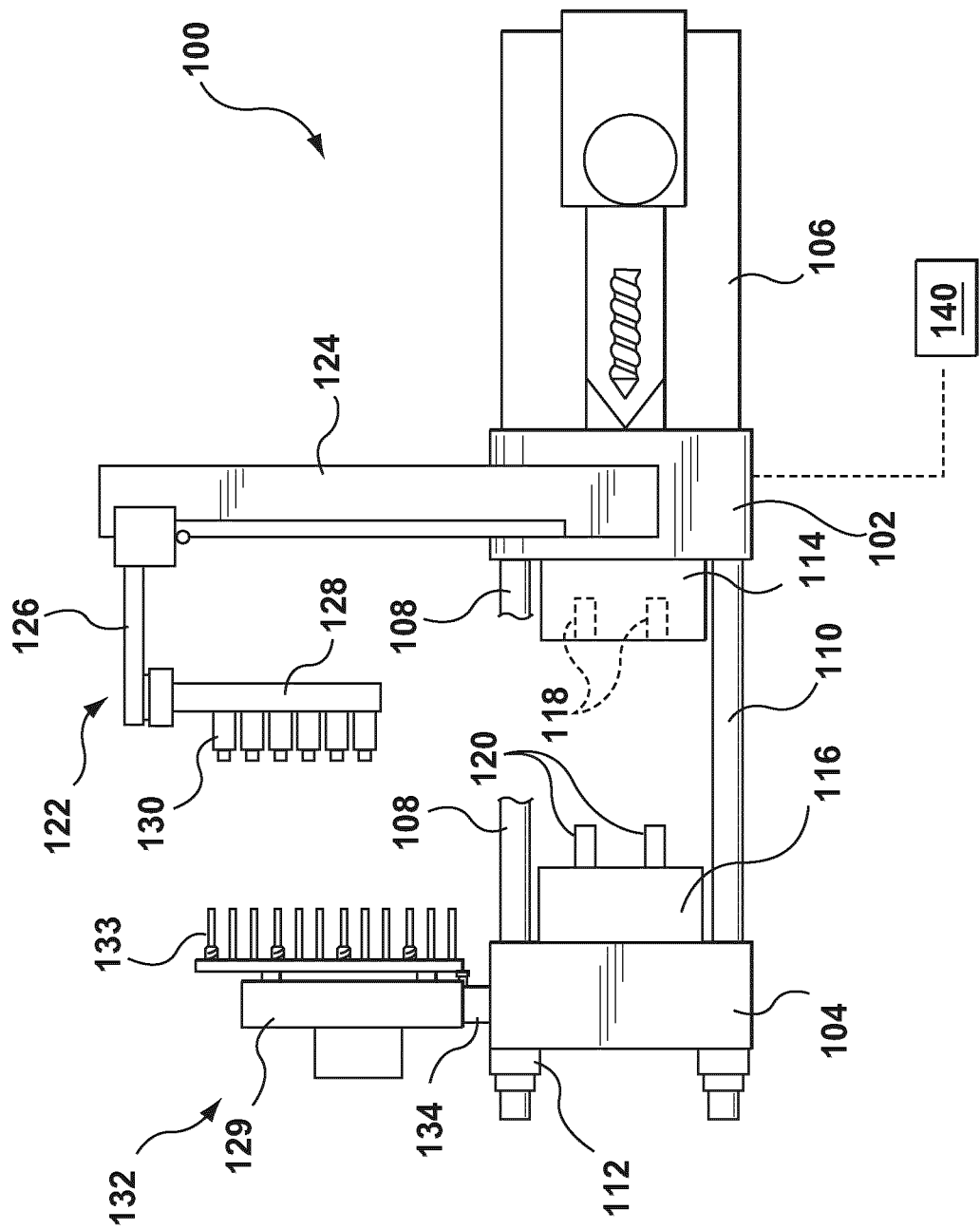
FIG. 1 is a plan view schematic diagram of a molding system 100, which can be adapted for implementation of non-limiting embodiments of the present technology.

With reference to FIG. 1, there is depicted a non-limiting embodiment of a molding system 100 which can be adapted to implement embodiments of the present technology. For illustration purposes only, it shall be assumed that the molding system 100 comprises an injection molding system for processing molding material, such as PET for example, to make preforms that are subsequently blow-molded into final shaped containers. However, it should be understood that in alternative non-limiting embodiments, the molding system 100 may comprise other types of molding systems, such as, but not limited to, compression molding systems, compression injection molding systems, transfer molding systems, metal molding systems and the like.

It should be further understood that embodiments of the present technology are applicable to the molding system 100 incorporating any multi-cavitation mold for producing any type of molded articles, including PET preform molds, thin-wall article molds, closure molds, molds for medical appliances and the like.

In the non-limiting embodiment of FIG. 1, the molding system 100 comprises a fixed platen 102 and a movable platen 104. In some embodiments of the present technology, the molding system 100 may include a third non-movable platen (not depicted). Alternatively or additionally, the molding system may include turret blocks, rotating cubes, turning tables and the like (all not depicted but known to those of skill in the art).

The molding system 100 further comprises an injection unit 106 for plasticizing and injection of molding material. The injection unit 106 can be implemented as a single stage or a two-stage injection unit.

In operation, the movable platen 104 is moved towards and away from the fixed platen 102 by means of stroke cylinders (not shown) or any other suitable means. Clamp force (also referred to as closure or mold closure tonnage) can be developed within the molding system 100, for example, by using tie bars 108, 110 (typically, four tie bars 108, 110 are present in the molding system 100) and a tie-bar clamping mechanism 112, as well as (typically) an associated hydraulic system (not depicted) that is usually associated with the tie-bar clamping mechanism 112. It will be appreciated that clamp tonnage can be generated using alternative means, such as, for example, using a column-based clamping mechanism, a toggle-clamp arrangement (not depicted) or the like.

A first mold half 114 can be associated with the fixed platen 102 and a second mold half 116 can be associated with the movable platen 104. In the non-limiting embodiment of FIG. 1, the first mold half 114 comprises one or more mold cavities 118. As will be appreciated by those of skill in the art, the one or more mold cavities 118 may be formed by using suitable mold inserts (such as a cavity insert, a gate insert and the like) or any other suitable means. As such, the first mold half 114 can be generally thought of as a "mold cavity half".

The second mold half 116 comprises one or more mold cores 120 complementary to the one or more mold cavities 118. As will be appreciated by those of skill in the art, the one or more mold cores 120 may be formed by using suitable mold inserts or any other suitable means. As such, the second mold half 116 can be generally thought of as a "mold core half". Even though not depicted in FIG. 1, the first mold half 114 may be further associated with a melt distribution network, commonly known as a hot runner, for distributing molding material from the injection unit 106 to each of the one or more mold cavities 118. Also, in those embodiments where the molding system 100 is configured to produce preforms, the second mold half 116 can be provided with neck rings (not depicted).

The first mold half 114 can be coupled to the fixed platen 102 by any suitable means, such as a suitable fastener (not depicted) or the like. The second mold half 116 can be coupled to the movable platen 104 by any suitable means, such as a suitable fastener (not depicted) or the like. It should be understood that in an alternative non-limiting embodiment of the present technology, the position of the first mold half 114 and the second mold half 116 can be reversed and, as such, the first mold half 114 can be associated with the movable platen 104 and the second mold half 116 can be associated with the fixed platen 102.

In an alternative non-limiting embodiment of the present technology, the fixed platen 102 need not be stationary and may be movable in relation to other components of the molding system 100.

FIG. 1 depicts the first mold half 114 and the second mold half 116 in a so-called "mold open position" where the movable platen 104 is positioned generally away from the fixed platen 102 and, accordingly, the first mold half 114 is positioned generally away from the second mold half 116. For example, in the mold open position, a molded article (not depicted) can be removed from the first mold half 114 and/or the second mold half 116. In a so-called "mold closed position" (not depicted), the first mold half 114 and the second mold half 116 are urged together (by means of movement of the movable platen 104 towards the fixed platen 102) and cooperate to define (at least in part) a molding cavity (not depicted) into which the molten plastic (or other suitable molding material) can be injected, as is known to those of skill in the art.

It should be appreciated that one of the first mold half 114 and the second mold half 116 can be associated with a number of additional mold elements, such as for example, one or more leader pins (not depicted) and one or more leader bushings (not depicted), the one or more leader pins cooperating with one more leader bushings to assist in alignment of the first mold half 114 with the second mold half 116 in the mold closed position, as is known to those of skill in the art.

The molding system 100 can further comprise a robot 122 operatively coupled to the fixed platen 102. Those skilled in the art will readily appreciate how the robot 122 can be operatively coupled to the fixed platen 102 and, as such, it will not be described here in any detail. The robot 122 comprises a mounting structure 124, an actuating arm 126 coupled to the mounting structure 124 and a take-off plate 128 coupled to the actuating arm 126. The take-off plate 128 comprises a plurality of molded article receptacles 130.

Generally speaking, the purpose of the plurality of molded article receptacles 130 is to remove molded articles from the one or more mold cores 120 (or the one or more mold cavities 118) and/or to implement post mold cooling of the molded articles. In the non-limiting example illustrated herein, the plurality of molded article receptacles 130 comprises a plurality of cooling tubes for receiving a plurality of molded preforms. However, it should be expressly understood that the plurality of molded article receptacles 130 may have other configurations. The exact number of the plurality of molded article receptacles 130 is not particularly limited.

Schematically depicted in FIG. 1 is the robot 122 of a side-entry type. However, it should be understood that in alternative non-limiting embodiments of the present technology, the robot 122 can be of a top-entry type. It should also be expressly understood that the term "robot" is meant to encompass structures that perform a single operation, as well as structures that perform multiple operations.

The molding system 100 further comprises a post-mold treatment device 132 operatively coupled to the movable platen 104. Those skilled in the art will readily appreciate how the post-mold treatment device 132 can be operatively coupled to the movable platen 104 and, as such, it will not be described here in any detail. The post-mold treatment device 132 comprises a mounting structure 134 used for coupling the post-mold treatment device 132 to the movable platen 104. The post-mold treatment device 132 further comprises a plenum 129 coupled to the mounting structure 134. Coupled to the plenum 129 is a plurality of treatment pins 133. The number of treatment pins within the plurality of treatment pins 133 generally corresponds to the number of receptacles within the plurality of molded article receptacles 130.

The molding system 100 further comprises a controller 140, the controller including a human-machine interface (not separately numbered) or an HMI, for short. Generally speaking, the controller 140 is configured to control one or more operations of the molding system 100. The HMI of the controller 140 can be implemented in any suitable interface. As an example, the HMI of the controller 140 can be implemented in a multi-functional touch screen. An example of the HMI that can be used for implementing non-limiting embodiments of the present technology is disclosed in co-owned U.S. Pat. No. 6,684,264, content of which is incorporated herein by reference, in its entirety.

Those skilled in the art will appreciate that the controller 140 may be implemented using pre-programmed hardware or firmware elements (e.g., application specific integrated circuits (ASICs), electrically erasable programmable read-only memories (EEPROMs), etc.), or other related components. In other embodiments, the functionality of the controller 140 may be achieved using a processor that has access to a code memory (not shown) which stores computer-readable program code for operation of the computing apparatus, in which case the computer-readable program code could be stored on a medium which is fixed, tangible and readable directly by the various network entities, (e.g., removable diskette, CD-ROM, ROM, fixed disk, USB drive), or the computer-readable program code could be stored remotely but transmittable to the controller 140 via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

In alternative non-limiting embodiments of the present technology, the HMI does not have to be physically attached to the controller 140. As a matter of fact, the HMI for the controller 140 can be implemented as a separate device. In some embodiments, the HMI can be implemented as a wireless communication device (such as a smartphone, for example) that is "paired" or otherwise communicatively coupled to the controller 140.

The controller 140 can perform several functions including, but not limited to, receiving from an operator control instructions, controlling the molding system 100 based on the operator control instructions or a pre-set control sequence stored within the controller 140 or elsewhere within the molding system 100, appreciate one or more operational parameters associated with the molding system and the like. According to non-limiting embodiments of the present technology, the controller 140 is further configured to process one or more of the appreciated operational parameters associated with the molding system, output information to the operator using the HMI and the like, as will be described herein below.

The molding system 100 further includes a number of monitoring devices (not depicted), the monitoring devices being configured to appreciate various operational parameters associated with the performance of the molding system 100. Generally speaking, these monitoring devices are known in the art and, as such, will not be described here at any length.

Just as an example, the molding system 100 may include a counter to count mold opening and closing to determine the number of cycles over a period of time and/or the cycle time of each cycle. The molding system 100 may also include a number of pressure gauges to measure pressure within various components of the molding system 100 (such as hydraulic fluid pressure or molding material pressure). The molding system 100 may also include various devices for determining quality of the molded article and/or for refusing molded articles that are not meeting pre-defined quality standards. For example, the molding system 100 may include a vision inspection system (not depicted), configured to visually inspect molded articles and to refuse those molded articles that do not meet the appearance or other quality specifications.

According to non-limiting embodiments of the present technology, the controller 140 is configured to appreciate a plurality of operational parameters associated with the molding system 100. The nature of the so-appreciated plurality of operational parameters can vary. How the controller 140 appreciates the plurality of operational parameters will depend, of course, on the nature of the so-appreciated plurality of operational parameters.

In some embodiments of the present technology, the plurality of operational parameters can be broadly categorized into "operational and supervisory variables" and "machine variables". The machine variables may include, but are not limited to, cycle time, cavitation of the mold, energy consumption and the like. Examples of the operational and supervisory variables include but are not limited to: resin costs, energy costs, labor costs, maintenance costs, molded article selling price, molding material or molded article scrap rate and the like. Naturally, examples provided herein should not be used as a limitation—a number of additional parameters are possible and will occur to those of skill in the art, having appreciated teachings of the instant description.

Generally, the "machine variables" are variables that can be appreciated, automatically or otherwise, by monitoring various aspects of the performance of the molding system 100. On the other hand, "operational and supervisory variables" are variables that cannot be quantified based on the performance of the molding system 100 alone and generally require input from one or more external sources in order to be appreciated. For example, operational and supervisory variables may be appreciated by auxiliary means. Examples of auxiliary means include manual input by an operator or supervisor, and an auxiliary device, such as a scrap weighing scale, which may transmit to the controller 140 of the molding system 100 the total weight of scrapped molded articles produced over a pre-determined period of time (e.g., the duration of a shift).

It will be appreciated by those skilled in the art that a given variable could be a machine variable and/or an operational and supervisory variable. As an example, molded article weight could be either a machine variable that is detectable by the molding system 100 or an operational and supervisory variable that is received by the controller 140 directly or indirectly from auxiliary means. Likewise, machine uptime could be a machine variable as the molding system 100 can detect when it is running and/or could be an operational and supervisory variable as an operator or supervisor could determine and input whether downtime of the molding system 100 was planned (which is not an indication of poor performance of the molding system 100) or unplanned (which is an indication of poor performance of the molding system 100).

In some embodiments of the present technology, the machine performance index can be solely based on the machine variables. In alternative embodiments, both the machine variables and the operational and supervisory variables are used in generating the machine performance index.

The controller 140 can appreciate some of the plurality of operational parameters by monitoring the operation of the molding system 100. For example, the controller 140 can be in communication with one or more of the above-mentioned or other monitoring devices potentially present within the molding system 100. Alternatively, the controller 140 can appreciate some of the plurality of operational parameters by receiving an indication of the given operational parameter from an operator of the molding system 100, via the above-mentioned HMI, for example. Alternatively, the controller can appreciate some of the plurality of operational parameters by retrieving them from a memory (not depicted) of either the controller 140 itself or another memory storage (not depicted) potentially present within the molding system 100.

The controller 140 can appreciate machine variables by monitoring the operation of the molding system 100. Just as an example, the controller 140 can appreciate the cycle time by monitoring the performance of the molding system 100. Naturally, the controller 140 can appreciate some of the machine variables by either the operator entering them using the HMI or by reading a memory tag (not depicted) associated with the mold (i.e. the above described first mold half 114 and the second mold half 116) that is used in the molding system 100. Various implementations of the memory tag (not depicted) are known in the art. Generally speaking, the memory tag (not depicted) may store information about the mold, the molded article to be produced, pre-defined control sequences, set-up sequences and the like.

For example, the operator may enter an indication of cavitation using the HMI of the controller 140 (in which case, the cavitation can be considered to be an operational and supervisory variable). Alternatively, the mold (i.e. the above described first mold half 114 and the second mold half 116) may be equipped with the memory tag, which memory tag may for example store an indication of the cavitation of the mold. In those implementations, the controller 140 can appreciate the cavitation by accessing the memory tag and reading the information therefrom (in which case, the cavitation can be considered to be a machine variable). In yet further embodiments, the memory tag may contain an indication of the mold cavitation of the mold (i.e. the above described first mold half 114 and the second mold half 116), but some of the mold cavities may not be operational at the time. Within those examples, the operator or the supervisor could enter the actual cavitation using the HMI (in which case, the cavitation could again be considered to be an operational and supervisory variable).

In some non-limiting embodiments of the present technology, the controller 140 can appreciate the operational and supervisory variables by receiving an indication of those parameters from the operator. However, within some implementations of the molding system 100, it is possible for the controller 140 to appreciate some (or even all) of the operational and supervisory variables by monitoring performance of the molding system 100. For example, some implementations of the molding machine 140 may include a device for weighing molded articles and/or a device to keep track of scrapped molded articles (for example, those molded articles that do not quality or weight specifications). Within those embodiments, the controller 140 can appreciate the part weight and/or scrap rates by monitoring the performance of the molding system 100.

Naturally, other ways for the controller 140 to appreciate some or all of these or other operational parameters are possible.

Just as an illustration, it shall be assumed that the controller 140 appreciates a set of the following plurality of operational parameters: (i) cavitation, (ii) uptime, (iii) cycle time, (iv) energy consumption, and (v) part weight. It should be expressly understood that the number and the type of the plurality of operational parameters are not limited to the example provided herein.

According to non-limiting embodiments of the present technology, the selection of the plurality of operational parameters can be done based on their individual or collective impact on the economic or performance value of the molding system 100. Naturally, the selection of the plurality of operational parameters can be amended from time to time, based on the business or technical needs of the operator running the molding system 100.

The controller 140 is further configured to (once the plurality of operational parameters is appreciated) generate a machine performance index. Generally speaking, the machine performance index is a single value based on and representative of the plurality of operational parameters associated with the molding system 100. Since the plurality of operational parameters have been pre-selected based on their economic or performance impact on the molding system 100, the machine performance index can be said to be representative of an economic productivity factor associated with the molding system 100.

Just as an example, the controller 140 can calculate the machine performance index using the following formula:

$$MPI = \frac{\text{Cavitation} \times \text{Uptime}}{\text{Cycle Time} \times \text{Energy} \times \text{Part Weight}}$$

where MPI stands for the machine performance index.

It should be expressly understood that the equation shown above is for illustration purposes only. Those skilled in the art, having the benefit of reading and appreciating the description presented herein will be able to formulate other equations. Some of the aspects that one may consider when formulating or varying the equation are as follows. The numerator and denominator can be chosen such that the operational parameters having increasing value with increasing numeric count are in the numerator, and the operational parameters having increasing value with decreasing numeric value are in the denominator. Based on this selection, the higher the machine performance index, the closer the given performance is to the target or ideal implementation. In other non-limiting embodiments of the present technology, the numerator and denominator can be reversed—in other words, the lower value of the machine performance index, the better the performance of the molding system 100. Naturally, other implementations of the equation are possible and will depend on business or technical needs of the operator running the molding system 100.

As an example of the calculation only, it shall be assumed that the cavitation of the given mold is 96 cavities, the uptime is 100%, the cycle time is 6.2 seconds, the energy consumption is 0.24 kWh/kg and the part weight is 9 grams. Therefore, applying the above referenced formula, the machine performance index is calculated to be 7.17.

In this example of the formula, the equation treats each of the plurality of operational parameters linearly. In alternative non-limiting embodiments of the present technology, it may be determined that some of the plurality of operational parameters has a more dominant effect on the economic performance of the molding machine. In those alternative embodiments, exponentiation can be employed to affect the weighting of the individual ones of the plurality of operational parameters or combinations of operational parameters. For example, where it is determined that part weight has a more dominant effect, exponents can be applied to the part weight in the above equation. As such, the equation above can include the following term: part weight^a, where a is the exponent. In an example, the exponent a can equal 2.

The controller 140 can then normalize the so calculated machine performance index. Generally speaking, the normalization of the machine performance index is executed in a way to enable the display of the normalized machine performance index to an operator of the molding system 100 in an easy to perceive manner. In other words, the normalized machine performance index can enable the operator of the molding system 100 to appreciate, at a glance, the overall performance efficiency of the molding system 100.

In some non-limiting embodiments of the present technology, the normalized machine performance index is an indication of how the machine performance index compares to the target performance index. The target performance index is a pre-set value that is indicative of the desired performance of the molding system 100. For example, the target performance index can be based on the committed performance of the molding system 100, which committed performance was indicated to the operator of the molding system 100 when the operator of the molding system 100 purchased the molding system 100 from a vendor. The target performance index can, of course, be changed from time to time. For instance, when an upgrade is performed on the molding system 100, the target performance index can be modified.

In some embodiments of the present technology, the target performance index can be pre-calculated and can be stored in the memory tag associated with the mold (i.e. the above described first mold half 114 and the second mold half 116). In other embodiments of the present technology, the target performance index can be hard coded into the controller 140. In yet other embodiments, the target performance index can be inputted by the operator of the molding system 100 using the HMI of the controller 140. For the avoidance of doubt, the target performance index can be inputted by others, such as a supervisor, a plant manager and the like.

In one non-limiting implementation of the present technology, the machine performance index is normalized to a scale of 0% to 100%. With reference to FIG. 2, there is depicted a non-limiting embodiment of a normalized machine performance index indicator 200. The normalized machine performance index indicator 200 can be displayed to the operator using the HMI of the controller 140. Generally speaking, the normalized machine performance index indicator 200 provides an indication to the operator as to how the molding system 100 is running as a whole. Within this illustration, the normalized machine performance index indicator 200 comprises a bar graph 202 with a plurality of zones 204. It should be noted that in alternative embodiments of the present technology, the normalized machine performance index indicator 200 can take a different visual form factor, i.e. is not limited to the bar chart. For example, the normalized machine performance index indicator 200 may be in the form of a pie chart or gauge.

In some embodiments of the present technology, each of the plurality of zones 204 is shown in a different color or a different shade of the same color. Just as an example, the plurality of zones 204 can be colored red, yellow and green, depending on the level of performance as indicated by the machine performance index. For example, the portion of the bar graph 202 indicating performance between 0% and 80% of the target performance index can be colored red. The portion of the bar graph 202 indicating performance between 80% and 90% of the target performance index can be colored yellow. And the portion of the bar graph 202 indicating performance between 90% and 100% of the target performance index can be colored green. Additionally, the bar graph 202 may further indicate the percentage values of the associated bands of the zones (i.e. 0%, 80%, 90% and 100% as depicted in FIG. 2).

It should be noted that even though the example scale of the bar graph 202 is selected between 0% and 100%, it is feasible that the normalized machine performance index can exceed 100% of the target performance index. This is possible, as an example, for where the actual cycle time is faster than the target (committed) cycle time.

Optionally, the normalized machine performance index indicator 200 may include an indication of the plurality of operational parameters 206 that were used to calculate the machine performance index. Optionally or additionally, the normalized machine performance index indicator 200 may include an indication of the nominal value of the machine performance index (7.17 shown in the illustration). In alternative embodiments, the indication of the plurality of operational parameters 206 and/or the nominal value of the machine performance index may be omitted.

Recalling that as an example, the controller 140 has calculated the machine performance index to be 7.17, it shall be assumed that the target machine performance index is 7.62. As such, the normalized machine performance index can be 94%, indicative of the current machine performance index being at 94% of the target performance index. The normalized machine performance index indicator 200 may optionally display the value associated with the normalized machine performance index—as is shown in FIG. 2, the value of 94%.

It should be expressly understood that the implementation of the normalized machine performance index indicator 200 depicted in FIG. 2 is purely for illustration purposes and numerous alternative implementations are possible.

The normalized performance index indicator 200 enables the operator, at a glance, to appreciate the overall performance of the molding system 100. If the normalized performance index indicator 200 is indicative of an acceptable performance level, the operator does not need to take any additional steps.

Figure 3:
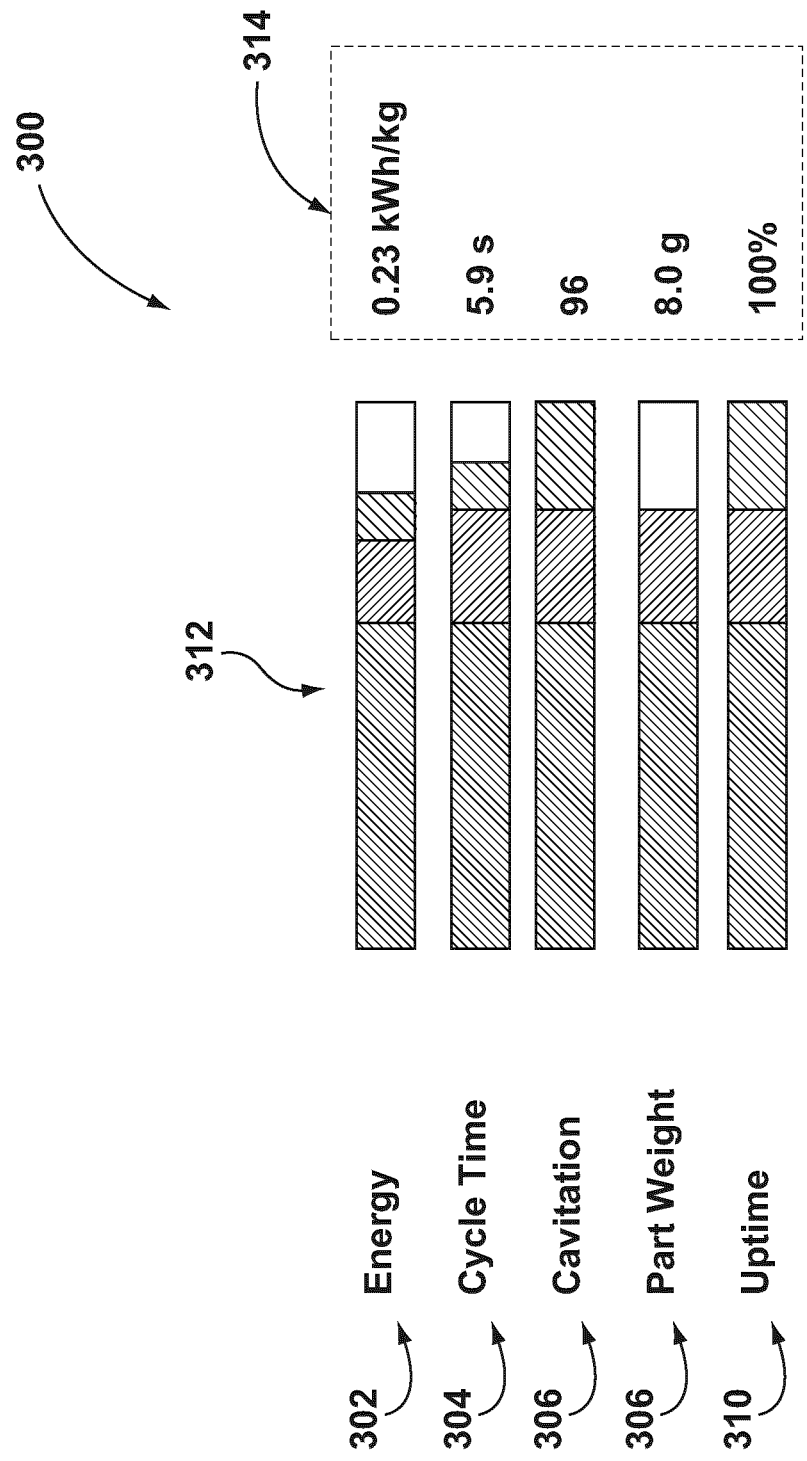
FIG. 3 is a schematic diagram of a performance index break down indicator 300, the performance index break down indicator 300 displayable on an HMI of a controller 140 of the molding system 100 of FIG. 1, the performance index break down indicator 300 being implemented in accordance with non-limiting embodiments of the present technology.

If however, the operator determines that the normalized performance index indicator 200 is not indicative of an acceptable performance level, the operator can enter the controller 140 into a troubleshooting mode. The operator can, for example, touch a portion of the screen of the HMI of the controller 140 associated with the normalized performance index display 200 and the HMI can, in response thereto, display a performance index break down indicator 300, a non-limiting embodiment of which is depicted in FIG. 3.

The performance index break down indicator 300 displays the individual performance index associated with each of the plurality of the operational parameters that were used for generating the machine performance index. Within this illustration, the performance index break down indicator 300 includes a first parameter line 302 (associated with the energy consumption parameter), a second parameter line 304 (associated with the cycle time), a third parameter line 306 (associated with the cavitation), a fourth parameter line 308 (associated with the part weight) and a fifth parameter line 310 (associated with the uptime). Needless to say, in alternative non-limiting embodiments of the present technology, the number of the lines within the performance index break down indicator 300 can vary and will depend on the set of selected plurality of operational parameters that were used to generate the machine performance index, or a subset thereof.

Each of the first parameter line 302, second parameter line 304, the third parameter line 306, the fourth parameter line 308 and the fifth parameter line 310 is associated with a respective one of bar graphs 312. The respective bar graph 312 can be implemented similarly to the bar graph 202, other than the respective bar graph 312 is indicative of the normalized value for each of the plurality of operational parameters (i.e. how the given one of the plurality of operational parameters compares to the associated target performance value).

The form factor of the performance index break down indicator 300 need not be limited to the bar graphs. However, in some embodiments it may be beneficial (but doesn't need to be so in every embodiment) that the form factors of the normalized performance index display 200 and the performance index break down indicator 300 are the same (for consistency and ease of appreciation of the information).

The performance index break down indicator 300 further includes an indication of individual performance targets 314. Within this example, the indication of individual performance targets 314 is indicative of the following individual performance targets: (i) 0.23 kWh/kg for energy consumption; (ii) 5.9 seconds for the cycle time; (iii) 96 cavities for the cavitation; (iv) 8 g for the part weight and 100% for the uptime. Recalling the examples provided above, the respective bar graphs 312 are indicative of cavitation and uptime being at target, while the energy, cycle time and the part weight being under target.

It is noted that the respective bar graphs 312 can be color coded, similarly (or differently) from the color coding scheme of the bar graph 202 of FIG. 2.

Now, once the operator appreciates the information presented by the performance index break down indicator 300, she can start determining troubleshooting measures and the focus of the troubleshooting measures. The actual response of the operator can vary. The operator may, for example, manually adjust one or more operational parameters of the molding system 100, change one or more components of the molding system 100, and/or execute an automatic troubleshooting routine potentially available within the molding system 100.

A technical effect associated with embodiments of the present technology may include the ability for the operator to easily appreciate the overall performance of the molding system 100 based on the "composite value of the multitude of operational parameters", namely the machine performance index. Another technical effect associated with embodiments of the present technology may include the ability for the operator to "zoom into" the underlying cause for the machine performance index not being satisfactory, namely to see the individual performance levels for individual contributing factors to the machine performance index.

Given the architecture of the molding system 100 depicted in FIG. 1 and the examples of the HMI screen depicted within FIGS. 2 and 3, it is possible to execute a method of operating a molding machine.

Figure 4:
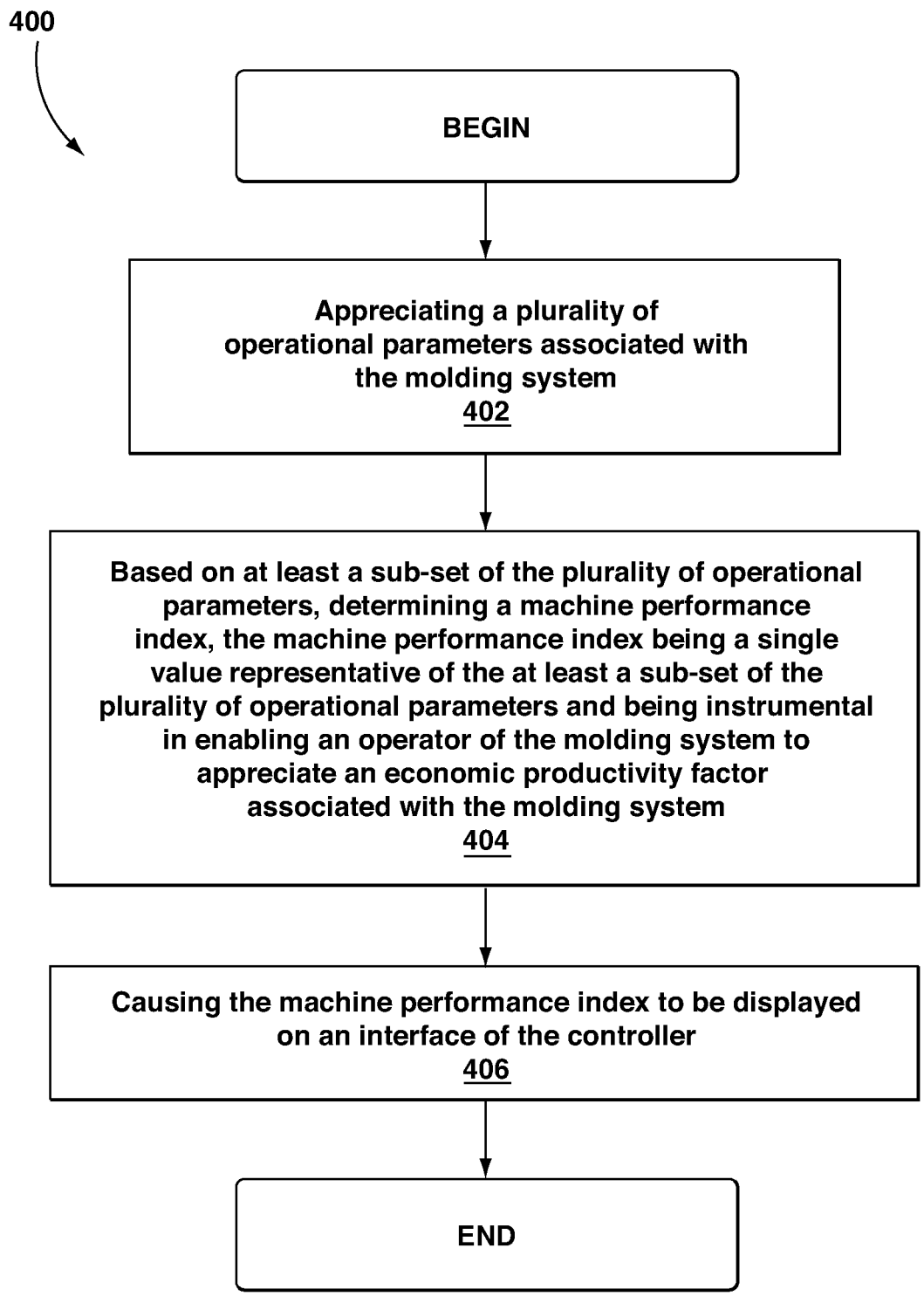
FIG. 4 depicts a block diagram of a method 400, the method 400 being implemented in accordance with non-limiting embodiments of the present technology, the method 400 executable by the controller 140 of the molding system 100 of FIG. 1.

With reference to FIG. 4, there is depicted a block diagram of a method 400, the method 400 being implemented in accordance with non-limiting embodiments of the present technology. The method 400 can be conveniently executed by the controller 140 of FIG. 1. To that end, the controller 140 can comprise (or can have access to) a computer usable information storage medium that includes computer-readable instructions, which instructions when executed, cause the controller 140 to execute the method 400.

Step 402—Appreciating a Plurality of Operational Parameters Associated with the Molding System 100

The method 400 begins at step 402, where the controller 140 appreciates a plurality of operational parameters associated with the molding system 100. How the controller 140 appreciates the plurality of operational parameters has been discussed at length above.

It is noted that in some embodiments of the present technology, step 402 can be executed on demand or, in other words, upon the operator of the molding system 100 indicating a positive desire to execute the method 400. This can be done, for example, by means of the operator pressing a dedicated soft button on the HMI of the controller 140. Alternatively, the step 402 can be executed upon a certain event, such as upon the operator entering the home screen of the HMI of the controller 140 or upon powering up of the molding system 100. Alternatively, the step 402 can be executed on a periodic basis.

The method 400 then proceeds to execution of step 404.

Step 404—Based on at Least a Sub-Set of the Plurality of Operational Parameters, Generating a Machine Performance Index, the Machine Performance Index being a Single Value Representative of the at Least a Sub-Set of the Plurality of Operational Parameters and being Instrumental in Enabling an Operator of the Molding System 100 to Appreciate an Economic Productivity Factor Associated Therewith Next, at step 404, the controller 140, based on at least a sub-set of the plurality of operational parameters, generates the machine performance index. As has been explained above, the machine performance index is a single value representative of the at least a sub-set of the plurality of operational parameters. The machine performance index is instrumental in enabling an operator of the molding system 100 to appreciate an economic productivity factor associated with the molding system 100.

Now, it should be noted that in some embodiments of the present technology, the sub-set of the plurality of operational parameters can be the entirety of the plurality of operational parameters (in other words, as part of step 402, the controller 140 may, as part of step 402, only appreciate those operational parameters that are used in calculating the machine performance index as part of step 404).

In alternative embodiments of the present technology, the sub-set of the plurality of operational parameters can be different from the plurality of operational parameters (in other words, as part of step 402, the controller 140 appreciates not only the operational parameters that are used in calculating the machine performance index, but also other operational parameters).

Regardless, individual ones of the operational parameters within the sub-set of the plurality of operational parameters can be selected based on their individual or collective impact on the economic or performance value of the molding system 100, as has been discussed above.

The method 400 then proceeds to execution of step 406.

Step 406—Causing 406 the Machine Performance Index to be Displayed on an Interface of the Controller 140

Next, the controller 140 causes the machine performance index to be displayed on the interface of the controller 140. In some embodiments of the present technology, the interface is the above mentioned HMI of the controller 140. But this need not be so in every embodiment of the present technology. For example, the interface can be implemented as a display of a wireless communication device associated with the user, which wireless communication device has been "paired" with the controller 140.

In some embodiments of the present technology, as part of executing step 406, the controller 140 causes the interface to display the above-described normalized machine performance index indicator 200. It is noted that in some embodiments of the present technology, the normalized machine performance index indicator 200 can be displayed on the interface by itself. Alternatively, the normalized machine performance index indicator 200 can be displayed on the interface in combination with other material, such as part of a home screen, part of a diagnostics screen, part of a troubleshooting screen and the like.

As has been described above, in order to display the normalized machine performance index indicator 200 and as part of executing step 406, the controller 140 first generates the normalized machine performance index by appreciating the target performance index and by comparing the currently appreciated machine performance index and the target performance index.

In some embodiments of the present technology, as part of step 406 and as an optional enhancement, responsive to receiving an affirmative action from an operator, the controller 140 can further cause the interface to display the above-described performance index break down indicator 300. The affirmative action of the operator can be touching a portion of the screen displayed on the interface, actuating a dedicated button (hard button or soft button) or any other means thereof.

The affirmative action can also encompass lack of action. For example, an affirmative action can be the operator not cancelling the display of the normalized machine performance index indicator 200 for a pre-determined portion of time, at which point the interface can be automatically switched to display the performance index break down indicator 300.

In some embodiments of the present technology, the method 400 can loop back to the execution of step 402 or simply end, until the operator triggers execution of the method 400.

Even though the above description has been presented with an example of a single machine performance index, in alternative non-limiting embodiments several machine performance indices can be generated. As an example, a first machine performance index can be generated on a first set of operational parameters. A second machine performance index can be generated on a second set of operational parameters. Within those embodiments, it can be said that the first machine performance index is indicative of a first economic productivity factor, while the second machine performance index is indicative of a second economic productivity factor.

In an alternative non-limiting embodiment of the present technology, a method can be executed at a supervisory entity, the supervisory entity being in communication with a plurality of molding systems, such as one or more of the molding system 100. The plurality of molding systems can be part of a same factory or can be located at different factories. The supervisory entity may be implemented as a server computer, for example.

The implementation of the method at the supervisory entity can include (i) receiving an indication of a first machine performance index being indicative of an economic productivity factor associated with a first one of the molding system 100; (ii) receiving an indication of a second machine performance index being indicative of an economic productivity factor associated with a second one of the molding system 100; and (iii) displaying both the first machine performance index and the second machine performance index to the operator of the supervisory entity.

In yet another alternative implementation, the indication of the respective ones of the first machine performance index and the second performance index can be embodied as the respective plurality of operational parameters from the respective ones of the first molding system 100 and the second molding system 100. In other words, when receiving the indication of the respective machine performance indices, the supervisory entity may receive respective sets of operational parameters, which the supervisory entity can analyze, as has been described above, in order to generate the first machine performance index and the second performance index.

In the above examples, the machine performance index has been described as a single value representing a snap shot in time. The machine performance index can additionally or alternatively be generated and displayed as machine performance index over time (for example, a graph depicting changes to the machine performance index over 24 hours in 30-minute increments or the like). Alternatively, the machine performance index can be displayed as an average over a period of time.

Additionally, even though the above description used an example of displaying the machine performance index on the HMI, in alternative non-limiting embodiments, the indication of the machine performance index can be printed as a report or transmitted as an electronic message. Therefore, the machine performance index can be made available to the operator of the molding system 100 by any suitable means—displaying on the HMI, printing, sending as an electronic message, as a short text message and the like.

It should be expressly understood that various technical effects mentioned throughout the description above need not be enjoyed in each and every embodiment of the present technology. As such, it is anticipated that in some implementations of the present technology, only some of the above-described technical effects may be enjoyed. While in other implementations of the present technology, none of the above enumerated technical effects may be present, while other technical effects not specifically enumerated above may be enjoyed. It should be expressly understood that the above enumerated technical effects are provided for illustration purposes only, to enable those skilled in the art to better appreciate embodiments of the present technology and by no means are provided to limit the scope of the present technology or of the claims appended herein below.

The description of the embodiments of the present technology provides only examples of the present technology, and these examples do not limit the scope of the present technology. It is to be expressly understood that the scope of the present technology is limited by the claims only. The concepts described above may be adapted for specific conditions and/or functions, and may be further extended to a variety of other applications that are within the scope of the present technology. Having thus described the embodiments of the present technology, it will be apparent that modifications and enhancements are possible without departing from the concepts as described. Therefore, what is to be protected by way of letters patent are limited only by the scope of the following claims:

The invention claimed is:

1. A method of operating a molding system, the method executable by a controller of the molding system, the method comprising:
monitoring, using one or more monitoring devices, a plurality of operational parameters associated with performance of the molding system, wherein the operational parameters comprise machine variables detectable by the molding system;
based on at least a subset of the plurality of operational parameters, generating a machine performance index, the machine performance index being a single value representative of the at least a subset of the plurality of operational parameters and being instrumental in enabling an operator of the molding system to appreciate an economic productivity factor associated therewith, wherein the machine performance index is generated as a ratio such that operational parameters having increasing value with increasing numeric count are in the numerator of the ratio and operational parameters having increasing value with decreasing numeric count are in the denominator of the ratio;
obtaining a target performance index associated with the molding system, the target performance index being an indicator of desired performance level of the molding system;
normalizing the machine performance index in accordance with a scale comprising a plurality of zones, each zone defining a performance value; and
displaying, via a user interface associated with the molding system, a graphical representation of the normalized machine performance index, the graphical representation including a graphical indicator showing a current level of the normalized machine performance index as a percentage of the target performance index, the percentage of the target performance index comprising one of the plurality of zones.

2. The method of claim 1, wherein the plurality of operational parameters includes a subset of: (i) cavitation, (ii) uptime, (iii) cycle time, (iv) energy consumption, or (v) part weight.

3. The method of claim 2, wherein the plurality of operational parameters includes: (i) cavitation, (ii) uptime, (iii) cycle time, (iv) energy consumption, and (v) part weight.

4. The method of claim 1, further comprising one of (i) receiving an indication of said target performance index from an operator; (ii) accessing a memory of the controller storing the indication; and (iii) accessing a memory tag associated with a mold used in the molding system and retrieving the indication.

5. The method of claim 1, further comprising in response to receiving an input from an operator, causing the user interface to display a performance index break down indicator, the performance index break down indicator showing a respective performance indicator associated with at least two of the plurality of operational parameters.

6. The method of claim 1, wherein the plurality of operational parameters includes (i) cavitation, (ii) uptime, (iii) cycle time, (iv) energy consumption, and (v) part weight, and wherein generating a machine performance index comprises applying the formula:

$$MPI = \frac{\text{Cavitation} \times \text{Uptime}}{\text{Cycle Time} \times \text{Energy} \times \text{Part Weight}}$$

where MPI is the machine performance index.

7. The method of claim 6, further comprising weighting the plurality of operational parameters when generating the machine performance index, wherein the weighting includes applying exponents to one or more of the plurality of operational parameters.

8. The method of claim 1, wherein said machine performance index representative of a first economic productivity factor, and wherein the method further comprises generating a second machine performance index representative of a second economic productivity factor.

9. The method of claim 8, further comprising displaying, via the user interface, the second machine performance index.

10. A controller of a molding system, the controller having a user interface, the controller being configured to:
monitor, using one or more monitoring devices, a plurality of operational parameters associated with performance of the molding system, wherein the operational parameters comprise machine variables detectable by the molding system;
based on at least a subset of the plurality of operational parameters, generate a machine performance index, the machine performance index being a single value representative of the at least a subset of the plurality of operational parameters and being instrumental in enabling an operator of the molding system to appreciate an economic productivity factor associated therewith wherein the machine performance index is generated as a ratio such that operational parameters having increasing value with increasing numeric count are in the numerator of the ratio and operational parameters having increasing value with decreasing numeric count are in the denominator of the ratio;
obtain a target performance index associated with the molding system, the target performance index being an indicator of desired performance level of the molding system;
normalize the machine performance index in accordance with a scale comprising a plurality of zones, each zone defining a performance value; and
display, via the user interface, a graphical representation of the normalized machine performance index, the graphical representation including a graphical indicator showing a current value of the normalized machine performance index as a percentage of the target performance index, the percentage of the target performance index comprising one of the plurality of zones.

* * * * *